(12) United States Patent  (10) Patent No.: US 8,293,360 B2
Cousin et al.  (45) Date of Patent: Oct. 23, 2012

(54) BAFFLE

(75) Inventors: Henri Cousin, Villeneuve-d'Ascq (FR); Guillaume Lecroart, Silly (BE)

(73) Assignee: Sika Technology AG, Baar (CH)

( * ) Notice: Subject to any disclaimer, the term of this patent is extended or adjusted under 35 U.S.C. 154(b) by 935 days.

(21) Appl. No.: 12/038,608

(22) Filed: Feb. 27, 2008

(65) Prior Publication Data
US 2009/0214820 A1  Aug. 27, 2009

(51) Int. Cl.
*B32B 7/04* (2006.01)

(52) U.S. Cl. ............. 428/223; 428/221; 428/304.4; 428/309.9; 296/193.01; 277/590

(58) Field of Classification Search .......... 428/212, 428/304.4, 119, 221, 223; 296/193.1; 277/628
See application file for complete search history.

(56) References Cited

U.S. PATENT DOCUMENTS

| | | |
|---|---|---|
| 5,185,117 A | 2/1993 | Hawley |
| 6,131,897 A | 10/2000 | Barz et al. |
| 6,186,769 B1 | 2/2001 | Hawley |
| 6,263,635 B1 | 7/2001 | Czaplicki |
| 6,296,298 B1 | 10/2001 | Barz |
| 6,311,452 B1 | 11/2001 | Barz et al. |
| 6,358,584 B1 | 3/2002 | Czaplicki |
| 6,368,438 B1 | 4/2002 | Chang et al. |
| 6,382,635 B1 | 5/2002 | Fitzgerald |
| 6,387,470 B1 | 5/2002 | Chang et al. |
| 6,419,305 B1 | 7/2002 | Larsen |
| 6,467,834 B1 * | 10/2002 | Barz et al. ............... 296/187.02 |
| 6,471,285 B1 | 10/2002 | Czaplicki et al. |
| 6,474,723 B2 | 11/2002 | Czaplicki et al. |
| 6,561,571 B1 | 5/2003 | Brennecke |
| 6,668,457 B1 | 12/2003 | Czaplicki |
| 6,729,425 B2 | 5/2004 | Schneider et al. |
| 6,777,049 B2 | 8/2004 | Sheldon et al. |
| 6,786,533 B2 | 9/2004 | Bock et al. |
| 6,793,274 B2 | 9/2004 | Riley et al. |
| 6,880,657 B2 | 4/2005 | Schneider et al. |
| 6,883,858 B2 | 4/2005 | Barz |
| 6,890,021 B2 | 5/2005 | Bock et al. |
| 6,905,745 B2 | 6/2005 | Sheldon et al. |
| 6,920,693 B2 | 7/2005 | Hankins et al. |
| 6,932,421 B2 | 8/2005 | Barz |
| 6,941,719 B2 * | 9/2005 | Busseuil et al. ............. 52/846 |
| 6,953,219 B2 | 10/2005 | Lutz et al. |
| 7,025,409 B2 | 4/2006 | Riley et al. |

(Continued)

FOREIGN PATENT DOCUMENTS

EP  073099  9/1996

(Continued)

*Primary Examiner* — Rena Dye
*Assistant Examiner* — Yan Lan
(74) *Attorney, Agent, or Firm* — Rader, Fishman & Grauer PLLC

(57) ABSTRACT

A baffle is provided that includes a body portion having a first layer and a second layer defining a free space therebetween. A sealer is disposed on the body portion in the space between the first layer and the second layer. The space has a predetermined volume and the sealer is expandable in the space. When placed in a cavity, such as a vehicle cavity, the sealer also expands into the cavity to seal the cavity. The baffle is more light-weight and capable of reducing noise and vibration, especially at higher frequencies than traditional baffles.

11 Claims, 2 Drawing Sheets

U.S. PATENT DOCUMENTS

| | | | |
|---|---|---|---|
| 7,077,460 B2 | 7/2006 | Czaplicki et al. | |
| 7,105,112 B2 | 9/2006 | Czaplicki et al. | |
| 7,111,899 B2 | 9/2006 | Gray | |
| 7,114,763 B2 | 10/2006 | Riley et al. | |
| 7,144,071 B2 | 12/2006 | Le Gall et al. | |
| D538,983 S | 3/2007 | Green et al. | |
| 7,194,804 B2 | 3/2007 | Czaplicki | |
| 7,255,388 B2 | 8/2007 | Le Gall et al. | |
| 7,290,828 B2 * | 11/2007 | Kosal et al. | 296/187.02 |
| 7,296,847 B2 | 11/2007 | Czaplicki et al. | |
| 7,313,865 B2 | 1/2008 | Czaplicki et al. | |
| 7,374,219 B2 | 5/2008 | Brennecke | |
| 7,478,478 B2 | 1/2009 | Lutz et al. | |
| 7,479,246 B2 | 1/2009 | Muteau et al. | |
| 7,494,179 B2 | 2/2009 | Deachin et al. | |
| 7,503,620 B2 | 3/2009 | Brennecke et al. | |
| 2001/0017018 A1 | 8/2001 | Czaplicki | |
| 2002/0160130 A1 | 10/2002 | Sheldon et al. | |
| 2002/0174954 A1 | 11/2002 | Busseuil et al. | |
| 2003/0003174 A1 | 1/2003 | Miura et al. | |
| 2003/0042056 A1 * | 3/2003 | Schneider et al. | 180/68.5 |
| 2003/0057737 A1 | 3/2003 | Bock et al. | |
| 2003/0090129 A1 | 5/2003 | Riley et al. | |
| 2003/0184121 A1 | 10/2003 | Czaplicki et al. | |
| 2003/0218019 A1 | 11/2003 | Le Gall et al. | |
| 2004/0046421 A1 | 3/2004 | Barz | |
| 2004/0084141 A1 | 5/2004 | Czaplicki | |
| 2004/0143969 A1 | 7/2004 | Czaplicki et al. | |
| 2004/0159481 A1 | 8/2004 | Schneider et al. | |
| 2004/0164588 A1 | 8/2004 | Lutz et al. | |
| 2004/0207233 A1 | 10/2004 | Bock et al. | |
| 2004/0212220 A1 | 10/2004 | Riley et al. | |
| 2004/0224108 A1 | 11/2004 | Sheldon et al. | |
| 2004/0227377 A1 | 11/2004 | Gray | |
| 2004/0256888 A1 | 12/2004 | Le Gall et al. | |
| 2004/0266899 A1 | 12/2004 | Muenz et al. | |
| 2005/0017543 A1 | 1/2005 | Riley et al. | |
| 2005/0040671 A1 | 2/2005 | Barz | |
| 2005/0194706 A1 * | 9/2005 | Kosal et al. | 264/46.5 |
| 2005/0212332 A1 | 9/2005 | Sheldon et al. | |
| 2005/0276970 A1 | 12/2005 | Busseuil et al. | |
| 2006/0006695 A1 | 1/2006 | Lutz et al. | |
| 2006/0008615 A1 | 1/2006 | Muteau et al. | |
| 2006/0057333 A1 | 3/2006 | Brahim | |
| 2006/0061115 A1 | 3/2006 | Brennecke | |
| 2006/0267378 A1 | 11/2006 | Czaplicki et al. | |
| 2006/0272884 A1 | 12/2006 | Vilcek et al. | |
| 2007/0045866 A1 | 3/2007 | Gray et al. | |
| 2007/0075569 A1 | 4/2007 | Barz et al. | |
| 2007/0080559 A1 | 4/2007 | Stolarski et al. | |
| 2007/0090666 A1 | 4/2007 | Brennecke et al. | |
| 2007/0101679 A1 | 5/2007 | Harthcock et al. | |
| 2007/0281523 A1 | 12/2007 | Riley | |
| 2008/0023987 A1 | 1/2008 | Schneider et al. | |
| 2008/0143143 A1 | 6/2008 | Brennecke | |
| 2008/0202674 A1 | 8/2008 | Schneider et al. | |
| 2008/0257491 A1 | 10/2008 | Czaplicki et al. | |
| 2009/0085379 A1 | 4/2009 | Takahashi et al. | |
| 2009/0108626 A1 | 4/2009 | Richardson et al. | |

FOREIGN PATENT DOCUMENTS

| | | |
|---|---|---|
| FR | 2884200 | 10/2006 |
| JP | 7232664 | 5/1995 |

* cited by examiner

BAFFLE

BACKGROUND

1. Technical Field

The present embodiments generally relate to a baffle.

2. Description of the Related Art

Various commercial objects benefit from a rigid structural foundation while ideally remaining light-weight. In many circumstances, these objects are produced with frames that define internal cavities. For instance, the frame may be formed from a metal such as steel, and leaving a portion of the frame hollow (i.e., the cavity) reduces the weight of the frame. However, the cavity may foster an increase in sound and vibrations. A common approach to mitigating the added sound and vibrations within cavities includes sealing the cavity. Sealing also provides other added benefits. Thus, sealing the cavity is an important aspect of designing objects to be light-weight while still providing valued vibration dampening and noise abatement. Such technology is often used in vehicles, including automobiles and airplanes, but may be used in other industries as well. Traditionally, a baffle is disposed across the cavity, and a sealer, such as foam, expands to fill in space around the baffle, which prevents fluid flow through the cavity, ultimately resulting in decreased noise and vibrations.

The baffle and sealer combination increase the weight of the frame. Often, the body portion of the baffle must be sufficiently thick and spaced appropriately throughout the frame to reduce noise and vibration. Unfortunately, the size and quantity of the baffles increase the weight of the frame. Although this weight increase is still less than the frame without the cavity, a baffle is needed that improves noise and vibration reduction without largely increasing the weight of the frame.

BRIEF DESCRIPTION OF THE DRAWINGS

The present embodiments become better understood by reference to the following detailed description when considered in connection with the accompanying drawings, wherein.

DETAILED DESCRIPTION

A baffle provides an increase in noise and vibration reduction without largely increasing the weight of the frame. The baffle includes a body portion having a first layer spaced from a second layer. The space defines a predetermined volume. A sealer is disposed in the space, and as the sealer expands, the space is filled by the sealer. In one embodiment, the baffle is used in a vehicle frame defining a cavity. When placed in the cavity, and by heat effect the sealer expands between the first and second layers and into the cavity. The resulting baffle is more light-weight and capable of reducing noise and vibration, especially at higher frequencies than traditional baffles.

Figure 1:
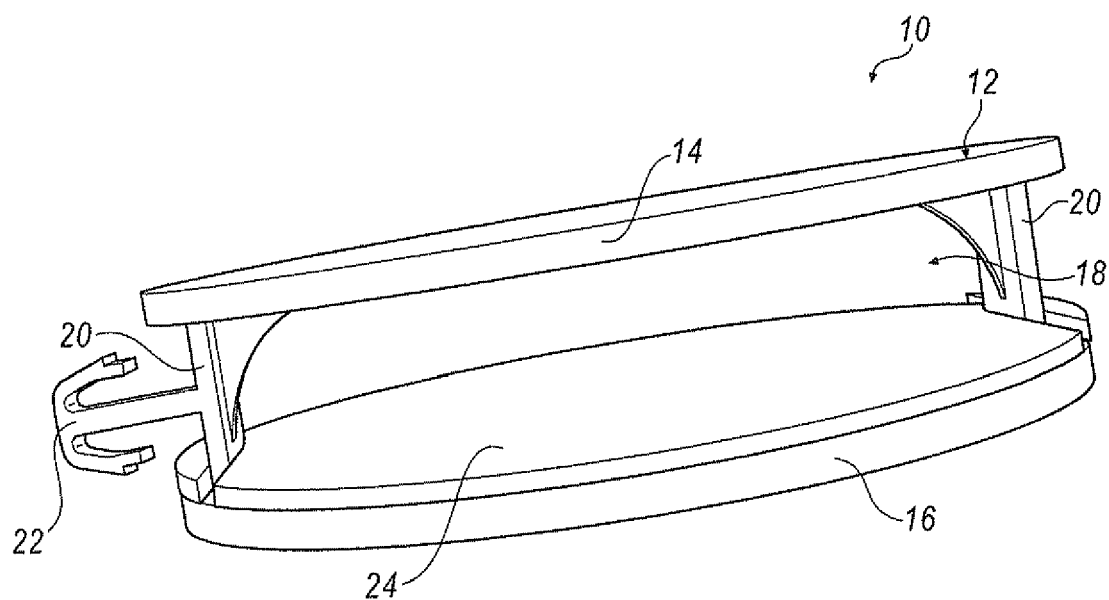
FIG. 1 is a perspective view of the baffle having an unexpanded sealer according to an embodiment.

Referring to the Figures, wherein like numerals indicate like or corresponding parts, a baffle is shown generally at numeral 10. FIG. 1 is a perspective view of an exemplary embodiment of the baffle 10. The baffle 10 may be disposed in a cavity defined by a frame, such as a vehicle frame. It is to be appreciated that the baffle 10 may be used in any other type of cavity. The baffle 10 includes a body portion 12 having a first layer 14 spaced from a second layer 16 to define a space 18 therebetween. The first and second layers 14, 16 may have any shape, which may depend on the cross-sectional configuration of the cavity. For instance, the first and second layers 14, 16 have a generally circular shape to fit into a cavity having a generally cylindrical configuration. Should the cavity have a generally rectangular configuration, the first and second layers 14, 16 may have a generally rectangular or square shape to fit in the cavity. It is to be appreciated that the first and second layers 14, 16 may have any other shape to fit into the cavity. In one embodiment, at least a portion of the first layer 14 and the second layer 16 are planar. Also, at least a portion of the first layer 14 is parallel to at least a portion of the second layer 16. Even though only two layers are depicted in the accompanying Figures, it is to be appreciated that, in another embodiment, the baffle 10 may include more than two layers.

The baffle 10 further includes at least one spacer 20 extending between the first and second layers 14, 16. In one embodiment, the spacer 20 is integrally formed with both the first layer 14 and the second layer 16. However, it is to be appreciated that the spacer 20 may be connected to the first layer 14 or the second layer 16 in other ways. For instance, the spacer 20 may be fastened to the first and/or second layers 14, 16 with a screw or other means. As discussed in greater detail below, in another embodiment, the spacer 20 may include at least one clip (22) for attaching to at least one of the first and second layers 14, 16.

Also, a clip 22 may extend from at least one of the spacers 20. The clip 22 may be keyed to fit into a hole defined by the frame so that the baffle 10 is oriented properly in the cavity. Alternatively, the clip 22 may extend from other portions of the baffle 10.

A sealer 24 is disposed on the body portion 12 in the space 18 between the first layer 14 and the second layer 16. Specifically, the sealer 24 may be disposed on the first layer 14, the second layer 16, or both using any method known in the art. In one embodiment, the sealer 24 is overmolded onto the first and/or second layer 16 or also other process. The sealer 24 may be any sealer 24 known in the art. For instance, the sealer 24 may include an expandable material, such as a foam or resin. In one embodiment, the sealer 24 includes a heat expandable material. When used in a vehicle, the heat generated by a bake oven may cause the sealer 24 to expand.

Figure 2:
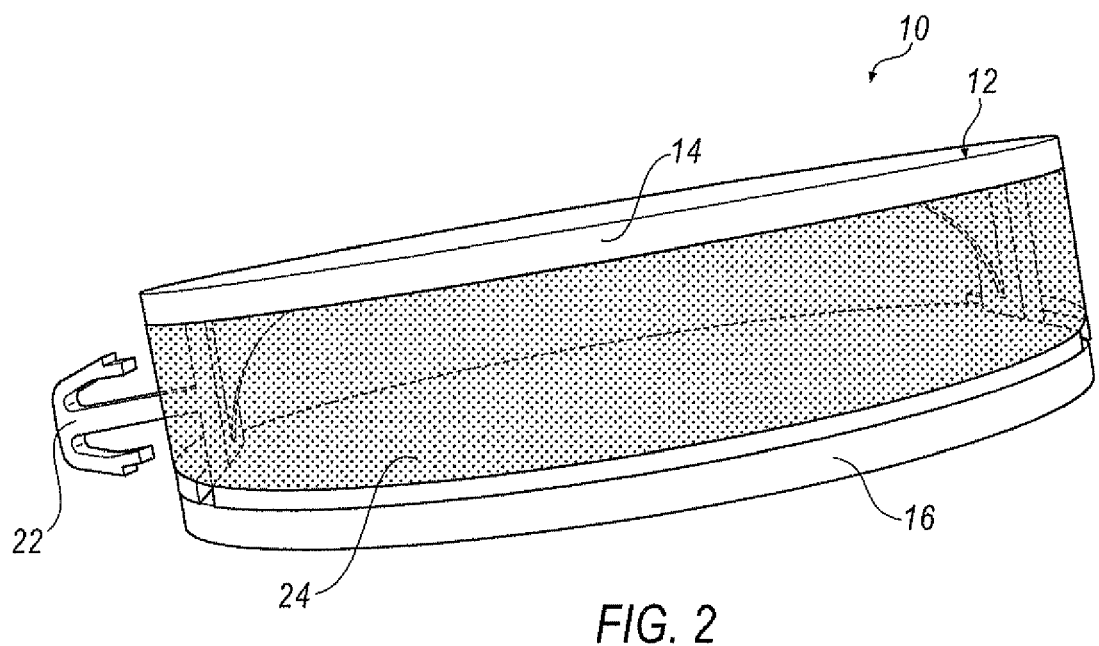
FIG. 2 is a perspective view of the baffle having an expanded sealer according to an embodiment.

FIG. 2 is a perspective view of an exemplary embodiment of the baffle 10 after the sealer 24 is expanded. The unexpanded sealer 24 is shown as a dashed line on the second layer 16. The space 18 has a predetermined volume, and the sealer 24 is expandable to fill the space 18. In one embodiment, the first and second layers 14, 16 are formed from a non-expanding material. As the sealer 24 expands, the volume of the space 18 remains constant so that the sealer 24 may fill the space 18. As the space 18 is filled by the sealer 24, transmission loss (i.e., noise reduction) is improved. In other words, the baffle 10 provides greater sound and vibration dampening, especially at higher frequencies when the sealer 24 expands to fill the space 18. The sealer 24 provides a barrier against dust and fluids as well.

The space 18 defined by the first layer 14 and the second layer 16 may have any volume. Similarly, the distance between the first layer 14 and the second layer 16 may be any distance. In one embodiment, the first layer 14 and the second layer 16 may be as close as 2 mm apart. In another embodiment, the first layer 14 and the second layer 16 may be as far as 150 mm apart. It is to be appreciated that the first layer 14 and the second layer 16 may be closer than 2 mm apart or further than 150 mm apart or any distance therebetween. It is also to be appreciated that the first layer 14 and the second layer 16 may be spaced at any distance at or between 2 mm and 150 mm. Before the foam is expanded, the spacers 20 are used to hold the first and second layers 14, 16 apart. When the foam is expanded, the spacers 20 help maintain the predetermined volume of the space 18.

Figure 3:
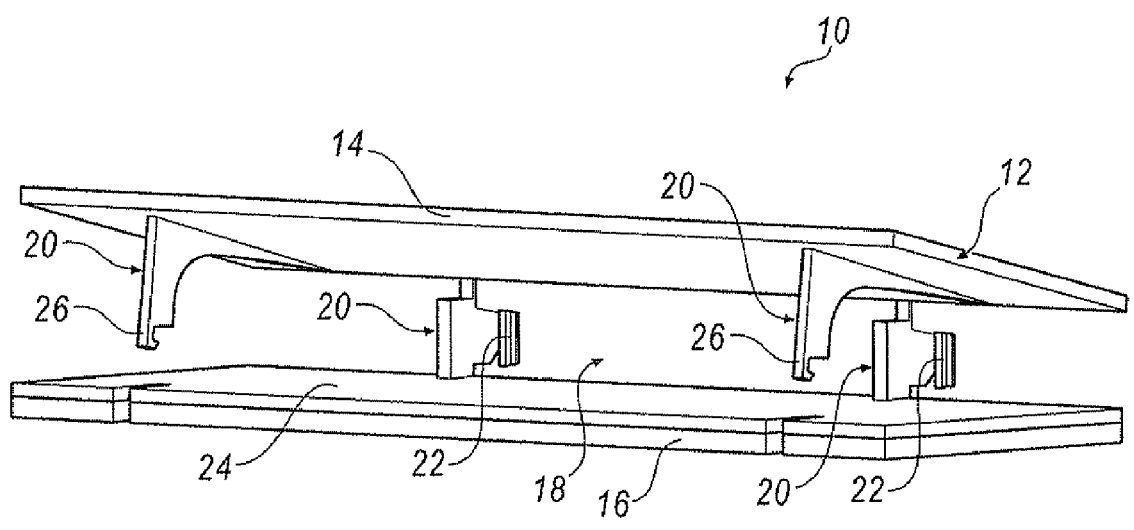
FIG. 3 is a perspective view of the baffle having a spacer extending between a first layer and a second layer according to an embodiment.

FIG. 3 is a perspective view of an embodiment of the baffle 10 having a generally rectangular shape, and specifically, the first and second layers 14, 16 have the generally rectangular shape. However, as previously discussed, it is to be appreciated that the baffle may generally have any shape. Also, in FIG. 3, the spacer 20 is integrally formed with the first layer 14 and includes at least one clip 26 integrally formed with the spacer 20 for attaching to the second layer 16. It is to be appreciated that the spacer 20 and the first layer 14 are spaced from the second layer 16 to better illustrate the clip 26. In operation, the clip 26 would be disposed on both the first layer 14 and the second layer 16 such that the first layer 14 and the second layer 16 would be substantially parallel to each other. It is to be further understood that other configurations of the spacer 20 relative to the first layer 14 and the second layer 16 are within the scope of the subject disclosure. For instance, the spacer 20 may be integrally formed with the second layer 16 and the clip 26 may attach the second layer 16 to the first layer 14. In another embodiment, the spacer 20 may be integrally formed with both the first layer 14 and the second layer 16. In yet another embodiment, the spacer 20 may include one clip 26 for attaching to the first layer 14 and another clip 26 for attaching to the second layer 16. It is to be appreciated that the baffle 10 may include any number of spacers 20.

It is to be understood that the above description is intended to be illustrative and not restrictive. Many alternative approaches or applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. In sum, it should be understood that the invention is capable of modification and variation and is limited only by the following claims.

The present embodiments have been particularly shown and described, which are merely illustrative of the best modes. It should be understood by those skilled in the art that various alternatives to the embodiments described herein may be employed in practicing the claims without departing from the spirit and scope as defined in the following claims. It is intended that the following claims define the scope of the invention and that the method and apparatus within the scope of these claims and their equivalents be covered thereby. This description should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

All terms used in the claims are intended to be given their broadest reasonable constructions and their ordinary meanings as understood by those skilled in the art unless an explicit indication to the contrary is made herein. In particular, use of the singular articles such as "a," "the," "the," etc. should be read to recite one or more of the indicated elements unless a claim recites an explicit limitation to the contrary.

What we claim is:

1. A baffle comprising:
   a body portion having a first layer and a second layer defining a space having a predetermined volume therebetween;
   a spacer having an integrally formed clip, the spacer extending from said first layer to said second layer, wherein the spacer is integrally formed with the first layer and wherein the clip is configured to attach the first layer to the second layer;
   a sealer disposed on said body portion in said space between said first layer and said second layer; and
   wherein said sealer is expandable in said space and wherein the predetermined volume of said space is configured to remain constant as said sealer expands after engaging both said first layer and said second layer.

2. A baffle as set forth in claim 1 wherein said sealer includes an expandable material.

3. A baffle as set forth in claim 2 wherein said expandable material is further defined as a heat expandable material.

4. A baffle as set forth in claim 1 wherein at least a portion of said first layer and said second layer are planar and at least a portion of said first layer is parallel to at least a portion of said second layer.

5. A vehicle having a frame defining a cavity, the vehicle comprising:
   a baffle disposed in said cavity; and
   wherein said baffle includes a body portion having a first layer and a second layer defining a space having a predetermined volume therebetween, a spacer having an integrally formed clip, the spacer extends from said first layer to said second layer, wherein the spacer is integrally formed with the first layer and wherein the clip is configured to attach the first layer to the second layer, and a sealer disposed on said body portion in said space between said first layer and said second layer, wherein said sealer is expandable to fill said space and wherein the predetermined volume of said space is configured to remain constant as said sealer expands after engaging both said first layer and said second layer.

6. A vehicle as set forth in claim 5 wherein said sealer includes an expandable material.

7. A vehicle as set forth in claim 6 wherein said expandable material is further defined as a heat expandable material.

8. A vehicle as set forth in claim 5 wherein at least a portion of said first layer and said second layer are planar and at least a portion of said first layer is parallel to at least a portion of said second layer.

9. A baffle comprising:
   a body portion having a first layer and a second layer defining a space therebetween;

a spacer having an integrally formed clip, wherein the spacer extends from said first layer to said second layer, wherein the spacer is integrally formed with the first layer and wherein the clip is configured to attach the first layer to the second layer;

a sealer disposed on said body portion in said space between said first layer and said second layer and wherein said sealer includes an expandable material;

wherein said space has a predetermined volume and said sealer is expandable in said space, and said predetermined volume is configured to remain constant as said sealer expands after engaging both said first layer and said second layer.

10. A baffle as set forth in 9 wherein said expandable material is further defined as a heat expandable material.

11. A baffle as set forth in 9 wherein at least a portion of said first layer and said second layer are planar and at least a portion of said first layer is parallel to at least a portion of said second layer.

* * * * *